UNITED STATES PATENT OFFICE.

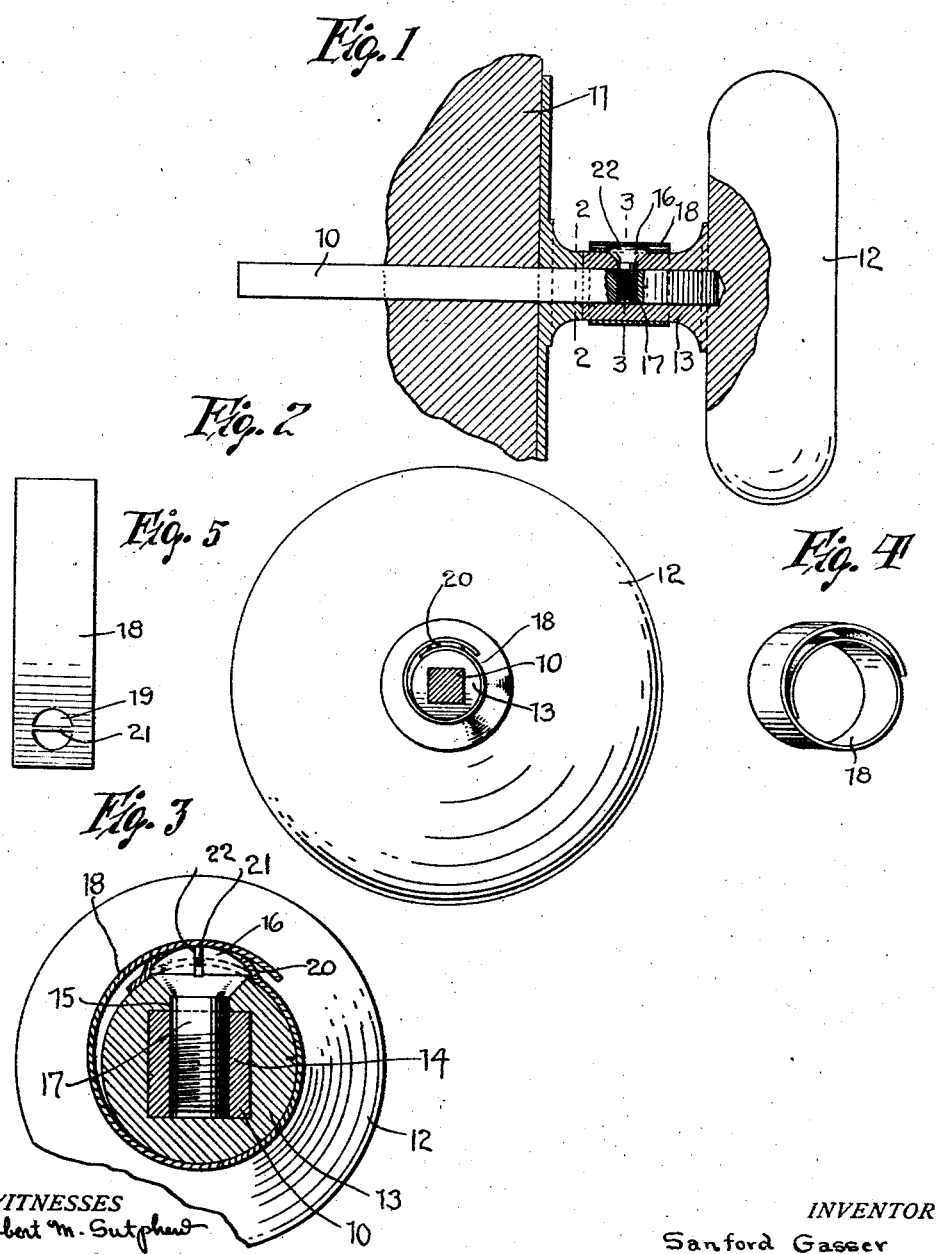

SANFORD GASSER, OF SHERMAN, MICHIGAN.

SCREW-HOLDER FOR DOOR-KNOBS.

1,050,640.  Specification of Letters Patent.  Patented Jan. 14, 1913.

Application filed March 14, 1912. Serial No. 683,754.

*To all whom it may concern:*

Be it known that I, SANFORD GASSER, a citizen of the United States, residing at Sherman, in the county of Wexford and State of Michigan, have invented certain new and useful Improvements in Screw-Holders for Door-Knobs, of which the following is a specification, reference being had therein to the accompanying drawing.

This invention relates to an attachment which is to be used in connection with a door knob, and which is used to prevent the screw which holds the door knob in connection with the shaft from working loose, thus preventing any danger of the door knob slipping from the handle when in attempting to open the door. This device comprises a strip of spring metal which is coiled to form a coil spring which fits upon the stem of the door knob, and is provided with a specially constructed opening in which the head of the screw is seated so that the band is prevented from turning upon the stem of the door knob.

This invention is illustrated in the accompanying drawings, wherein—

Figure 1 is a sectional view showing a door knob provided with the improved device. Fig. 2 is a section along the line 2—2 in Fig. 1. Fig. 3 is an enlarged sectional view along the line 3—3 in Fig. 1. Fig. 4 is a perspective view of the screw holder. Fig. 5 is a view of the blank from which the device is formed.

Referring to the accompanying drawings, it will be seen that the shaft 10 passes through the door 11, and is provided at one end with a knob 12 having a stem 13 which fits upon the outer end of the shaft 10, the shaft and stem being provided with alined openings 14 and 15, the opening 15 being provided with an enlarged outer end portion so as to form a seat for the head 16 of the screw 17 which holds the knob to the shaft.

The device which forms the subject-matter of this invention is used as an attachment to prevent this screw 17 from working loose, thus preventing the knob from coming loose from the shaft. This device comprises a coil spring 18 which is provided at its inner end with an opening 19 having the metal at its edges bent outwardly to form the collar 20 which engages the head 16 of the screw 17 so that the screw will be automatically seated in the opening when placing the device upon the stem of the knob, and which will grip the head so that the spring will be prevented from turning, the outer end of the spring bearing against the collar 20 to cause this gripping action. In order to place this spring upon the stem 13 it must be expanded a certain amount and it therefore has a tendency to contract and after the screw is in place it bears upon the collar 20 so that the collar is pressed into engagement with the head of the screw thus securely holding the device in position. The spring is provided with a tongue 21 which extends through the eye 22 of the screw to act as an additional lock to hold the screw in place. It should be noted, however, that if desired to remove the spring this can be easily done by uncoiling the spring so that the head of the screw will ride out of the opening 19.

What is claimed is:—

A device of the character described comprising a coil spring having overlapped end portions, the inner end being provided with an opening, the metal at the edges of said opening being bent outwardly to form a guiding and gripping collar, and a tongue extending across said opening and adapted to fit into the eye of a screw head.

In testimony whereof I hereunto affix my signature in presence of two witnesses.

SANFORD GASSER.

Witnesses:
R. D. FREDERICK,
W. T. LYLE.